United States Patent Office 3,786,041
Patented Jan. 15, 1974

3,786,041
MELAMINE-FORMALDEHYDE RESIN CONTAINING ALUMINA HYDRATE
Herbert Talsma, East Cleveland, Ohio, assignor to The Standard Oil Company, Cleveland, Ohio
No Drawing. Filed Dec. 8, 1972, Ser. No. 313,494
Int. Cl. C08g 51/18
U.S. Cl. 260—17.3                                       4 Claims

ABSTRACT OF THE DISCLOSURE

Melamine-formaldehyde molding resins containing from about 10 to about 900 parts of alumina hydrate per hundred parts of resin are outstanding for preparing molded resin articles requiring exceptional heat and light stability and a minimum of post-mold shrinkage.

---

This invention relates to aminotriazine resin molding compositions and more particularly to a melamine-formaldehyde molding composition containing a high concentration of alumina hydrate.

Melamine-formaldehyde molding powders have long been in use for molding dinnerware and related articles, however various problems associated with poor heat resistance, surface gloss and stain-resistance have had an adverse effect on consumer acceptance of this type of article. The present invention pertains to a molding powder composition that has exceptional heat and light stability and is not only well suited for the manufacture of heat-resistant dinnerware but is also an outstanding molding powder for the manufacture of light deflectors, electrical appliances, electrical outlets and the like.

Various types of dinnerware and tableware may be manufactured from the molding powders of this invention. For example, dinnerware may be produced that has a translucent quality with the "sound" and "feel" of porcelain. With compositions of high alumina hydrate concentrations, a high density stoneware-type melamine product can be manufactured. Additionally, a thin-walled disposable tableware container can be produced that can be utilized for heating foods in microwave ovens. These containers do not discolor on exposure to microwave heating, a disadvantage generally associated with containers molded from standard melamine molding powders.

The molding powder compositions of this invention also have the advantage of considerably reduced primary and secondary mold shrinkage, i.e. resin shrinkage resulting from the loss of water both during and after molding. This characteristic is important when articles are produced containing various extraneous objects such as metals inserts commonly employed in electronic components where close dimensional tolerances after heating are required.

The molding powder composition of this invention comprises a melamine-formaldehyde resin which contains up to about 900 parts by weight of alumina hydrate per hundred parts of resin (phr.). In this composition, the concentration level of the alumina hydrate is so high that the resin actually constitutes a binder and surface coating agent for the solid particles. Heretofore the concentration of fillers such as alpha-cellulose, paper fiber, mineral filler, glass fiber, walnut shell flour, asbestos and the like in this type of molding resin have been generally limited to about 70 parts per hundred parts of resin because of poor surface and flow properties of the resulting resin at higher concentrations. Surprisingly, however, the molding powder of this invention containing up to 900 parts by weight of alumina hydrate per hundred parts of resin has good flow properties and can be readily molded in conventional equipment. Generally, however, with alumina hydrate concentrations below about 200 parts by weight per hundred parts of resin, it is desirable to incorporate some additional filler such as alpha-cellulose, asbestos, paper, fiber and the like, in order to decrease the flow properties of the resin to within an acceptable range and to increase the impact-resistance of the resin. With resins containing below about 200 parts per hundred parts of resin of alumina hydrate it is preferable to add additional filler in amounts of from about 5 to 70 parts by weight per hundred parts of resin.

In a typical preparation of the melamine-formaldehyde resins of this invention, a commercial aqueous solution of formaldehyde containing 37% formaldehyde by weight is reacted with melamine in a molar ratio of from about 1:1 to about 3:1. The mixture is stirred and the pH of the mixture is adjusted to between 8 and 10 with a base such as sodium hydroxide or ammonium hydroxide. The mixture is heated to reflux until a syrup is formed.

The alumina hydrate is then added to the melamine-formaldehyde resin in concentrations of from about 10 to 900 parts of alumina hydrate by weight per 100 parts of resin. The mixture obtained is dried to "popcorn" and subsequently compounded to a molding powder by adding an acid curing catalyst, such as phthalic anhydride or maleic anhydride; mold release agents or lubricants, as for example, zinc stearate, stearic acid, glycerol-monostearate, N,N-ethylene-bis-stearamide, and the like; brighteners and pigments.

The drying step is accomplished in a continuous-type oven where the impregnated filler travels through an oven on a belt and is contacted with hot air at about 180–210° F. to remove moisture. The resin is obtained from the oven in a coarse granular form referred to as "popcorn." The "popcorn" granules are reduced in size by passing through a pre-grinder. To this finer granular material are added the aforementioned additives, the pigments, curing catalyst, mold-release agent, brightener and the like. These materials are then uniformly dispersed and blended into the resin substrate by ball milling, high-speed mixing as, for example, in a Prodex Henschel mixer, and similar mixing methods. Ball milling may be carried out at temperatures of from about 32–120° F. for a period of from about ½ to 24 hours. Although atmospheric pressure is normally used, pressures of up to about 25 p.s.i. may be employed, if so desired.

In an alternative procedure, the alumina hydrate may be added to the melamine-formaldehyde prepolymer, such as a spray-dried syrup, and this mixture compounded to a molding powder. The ground product is then molded into various shapes by subjecting the resin to temperatures of from about 250–375° F. and pressures of from about 1400–4000 p.s.i. for a period of 1–10 minutes.

In order that the present invention may be more readily understood, the following examples illustrate the various steps of the process in greater detail. These examples, however, are set forth primarily for the purpose of illustration and are not to be interpreted as limitations of the invention

EXAMPLE 1

Preparation of standard melamine-formaldehyde resin 756 parts (6 moles) of melamine and 1362 parts (16 moles) of 37% aqueous formaldehyde solution were introduced into a reaction vessel equipped with a reflux condenser, thermometer and stirrer. The mixture was stirred for several minutes to break up aggregated material and to form a uniform dispersion of the melamine throughout the mixture. The pH of the mixture was adjusted to 8.0, as measured by a glass electrode at 25° C., using 1 N sodium hydroxide. The reaction mixture was then heated to reflux and reflux continued until one drop of the clear resin hydrophobed in 25 cc. of water (25° C.) (Encyclopedia of Polymer Science and Technology, vol. 2, p. 30). The resin was cooled, added to 582 grams of alpha-cellulose and mixed by hand until no free resin syrup remained. The product was then mixed in a sigma blade mixer for a period of one hour.

The alpha-cellulose resin mixture was dried in an air stream for one hour at 190° F. and 18% relative humidity. The resulting dried product was ground on a screen mill to produce a powder in which the maximum particle size was less than 800 microns. The ground powder, along with 0.5 part of zinc stearate, 0.5 part of rutile titanium dioxide and 0.13% phthalic anhydride were milled in a ball mill for five hours. At this point, other pigments, dyes, and additives for flow and mold release were added. The resin was then molded at a pressure of 3000 p.s.i. and at a temperature of 347° C. for a period of three minutes.

EXAMPLE 2

Preparation of melamine-formaldehyde resin containing 340 parts of alumina hydrate per 100 parts of resin 567 grams (4.5 moles) of melamine and 820 grams (10 moles) of 37% aqueous formaldehyde solution (pH adjusted to 8.0 with 0.1 N sodium hydroxide) were introduced into a reaction vessel equipped with a reflux condenser, thermometer and stirrer. The reaction mixture was heated to reflux and refluxing continued until one drop of the clear resin hydrophobed in 25 cc. of water at 25° C. The warm resin thus produced was added to 2970 grams of alumina hydrate in a sigma blade mixer, preheated to 158° F. with stirring. The wet slurry was then dried and ground to a powder. 864 grams of this ground powder along with 1 gram of zinc stearate, 0.5 gram of phthalic anhydride, and other pigments, dyes and additives for flow and mold release were milled in a ball mill for three hours. The resin was then molded at a pressure of 3000 p.s.i. and at a temperature of 347° F. for a period of three minutes.

EXAMPLE 3

Preparation of melamine-formaldehyde resin containing 340 parts of alumina hydrate per 100 parts of resin A mixture of 567 grams of melamine and 2970 grams of alumina hydrate was introduced into a sigma blade mixer equipped with a reflux condenser and a heating jacket. 820 grams of 37% aqueous formaldehyde (pH adjusted to 8.0 with 0.1 N sodium hydroxide) was slowly added with stirring. The mixture was heated with reflux for 70 minutes. The wet slurry was dried and ground to a powder. 864 grams of this ground powder, along with 1 gram of zinc stearate, 0.5 gram phthalic anhydride, and other pigments, dyes and additives for flow and mold release were milled in a ball mill for three hours. The resin was then molded at a pressure of 3000 p.s.i. and at a temperature of 347° F. for a period of three minutes.

EXAMPLE 4

Preparation of melamine-formaldehyde resin containing 340 parts of alumina hydrate per 100 parts of resin 674 grams alumina hydrate, 190 grams of spray-dried melamine-formaldehyde resin (Monsanto No. 817 1:3 molar ratio melamine/formaldehyde), 3 grams of zinc stearate and 0.5 gram phthalic anhydride and other pigments, dyes and additives for flow and mold release were milled in a ball mill for three hours. The resin was then molded at a pressure of 3000 p.s.i. and at a temperature of 347° F. for a period of three minutes.

EXAMPLE 5

Preparation of melamine-formaldehyde resin containing 570 parts of alumina hydrate per 100 parts of resin The procedure of Example 4 was repeated using 30 grams of spray-dried melamine-formaldehyde resin (Monsanto No. 817) and 170 grams of alumina hydrate.

EXAMPLE 6

Preparation of melamine-formaldehyde resin containing 900 parts of alumina hydrate per 100 parts of resin The procedure of Example 4 was repeated using 20 grams of spray-dried melamine-formaldehyde resin (Monsanto No. 817) and 180 grams of alumina hydrate.

Samples of the resin prepared in the examples above were compared for post-mold shrinkage, heat stability, light reflection and flow characteristics according to the following procedures.

(A) Post-mold shrinkage: Post-mold shrinkage properties were measured according to the standard ASTM procedure D1299–55. In this test the post-mold shrinkage was measured in mil/inch after the samples were subjected to 220° F. for 48 hours.

(B) Heat stability: The heat stability tests employed in these examples were carried out in an air-circulated oven for the times and temperatures indicated.

(C) Light reflection: The percent light reflection was determined in a Kollmorgen "Color Eye" and was calculated from the ratio of the tristimulus Y value for the sample to the tristimulus Y° value for the magnesium oxide standard, multiplied by 100.

(D) Flow: Flow properties were measured according to the standard ASTM test procedure D569–59 (method B). In this test the degree of flow of the sample was measured in inches when subjected to a prescribed pressure for a prescribed length of time in an extrusion mold. Measurements were made in a Rossi-Peakes flow tester as described in U.S. Pat. 2,066,016.

As seen from the data shown in Table I, the resins containing alumina hydrate are substantially superior to the unmodified resin in all of the properties shown. The resins prepared in Examples 4, 5 and 6 had physical properties similar to those of Examples 2 and 3 and all of the resins had good molding properties.

TABLE I

[Comparisons of melamine-formaldehyde resins containing alumina hydrate with the unmodified resin]

| Test | Resin of— | | |
|---|---|---|---|
| | Example 1 | Example 2 | Example 3 |
| Post-mold shrinkage (mils/inch) | 17 | 6.1 | 7.5. |
| Heat stability (days) at: | | | |
| 275° F | Discoloration after <2 | No discoloration after 31 | No discoloration after 31. |
| 300° F | Discoloration after <1 | No discoloration after 9 | No discoloration after 21. |
| Percent reflection against MGO: Y/Y° x 100 | 72.0 | 84.3 | 83.0. |
| Flow (inches) | 0.42 | 1.15 | 1.40. |
| Microwave oven test (after 70 seconds) | Cracked, brown discoloration, loss of formaldehyde vapors, (after 50 seconds) | No cracking, no discoloration; no loss of formaldehyde vapors; surface temp. 185° F. | No cracking, no discoloration; no loss of formaldehyde vapors; surface temp. 212° F. |

I claim:
1. A melamine-formaldehyde resin composition containing about 10 to about 900 parts by weight of alumina hydrate per hundred parts of resin (phr.).
2. The resin composition of claim 1 containing from about 200 to about 600 parts of alumina hydrate phr.
3. The resin composition of claim 1 containing from about 10 to about 200 parts by weight of alumina hydrate phr. and from about 5 to about 70 parts by weight of cellulose phr.
4. The resin composition in claim 3 containing about 20 to about 80 phr. of alumina hydrate and about 30 to about 60 phr. of cellulose.

References Cited
UNITED STATES PATENTS
2,702,258    2/1955    Amick _____ 117—141
3,407,155    10/1968   Casebolt _____ 260—17.3

WILLIAM H. SHORT, Primary Examiner
E. WOODBERRY, Assistant Examiner

U.S. Cl. X.R.
260—39 R, 67.6 R

PO-1050
(5/69)

UNITED STATES PATENT OFFICE
CERTIFICATE OF CORRECTION

Patent No. 3,786,041   Dated January 15, 1974

Inventor(s) Herbert Talsma

It is certified that error appears in the above-identified patent and that said Letters Patent are hereby corrected as shown below:

Column 3, line 15, "347°C" should be ---347°F---.

Signed and sealed this 18th day of February 1975.

(SEAL)
Attest:

RUTH C. MASON
Attesting Officer

C. MARSHALL DANN
Commissioner of Patents
and Trademarks